United States Patent

Kretschmer et al.

[11] Patent Number: 6,027,583
[45] Date of Patent: Feb. 22, 2000

[54] MATERIAL IN POWDER OR WIRE FORM ON A NICKEL BASIS FOR A COATING AND PROCESSES AND USES THEREFOR

[75] Inventors: Ingo Kretschmer, Preverenges; Peter Heimgartner, St. Sulpice; Gary Robert Heath, Lausanne, all of Switzerland

[73] Assignee: Castolin S.A., Switzerland

[21] Appl. No.: 08/881,767

[22] Filed: Jun. 24, 1997

[30] Foreign Application Priority Data

Jun. 25, 1996 [DE] Germany .......................... 196 25 218
Jul. 13, 1996 [DE] Germany .......................... 196 28 346

[51] Int. Cl.$^7$ ..................................................... C22C 19/05
[52] U.S. Cl. .......................... 148/427; 420/453; 427/455; 427/456
[58] Field of Search ........................... 420/453; 148/427; 427/455, 456

[56] References Cited

U.S. PATENT DOCUMENTS 4,822,415  4/1989  Dorfman et al. .

FOREIGN PATENT DOCUMENTS

| 223135 | 5/1987 | European Pat. Off. . |
| 3241377 | 5/1983 | Germany . |
| 4007734 | 9/1991 | Germany . |
| 62-033089 | 2/1987 | Japan . |
| 7-090437 | 4/1995 | Japan . |
| 8-311630 | 11/1996 | Japan . |
| 826780 | 1/1960 | United Kingdom . |
| 85-00127 | 1/1985 | WIPO . |

*Primary Examiner*—Sikyin Ip
*Attorney, Agent, or Firm*—Bachman & LaPointe, P.C.

[57] ABSTRACT

A material in powder or wire form on a nickel basis for the production of a coating with a high level of resistance to corrosion and wear by means of a thermal coating process is of the following composition (in percent by weight):

| | |
|---|---|
| C | 0.005–1.0; |
| Cr | 10.0–26.0; |
| Mo | 8.0–20.0; |
| Fe | 0.1–10.0; |
| Si | 3.0–7.0; |
| B | 1.0–4.0; |
| Cu | 0.1–5.0; |
| Ni | Balance. |

The material in powder form can be alloyed and sprayed out of the melt or agglomerated out of different alloyed and non-alloyed metal powders. The coating material can also be used in the form of a filling wire or an alloyed and cast bar material.

17 Claims, No Drawings

MATERIAL IN POWDER OR WIRE FORM ON A NICKEL BASIS FOR A COATING AND PROCESSES AND USES THEREFOR

The invention concerns a material in powder or wire form on a nickel basis for the production of a coating with a high level of resistance to corrosion and wear by means of a thermal coating process, for example by thermal spraying, plasma powder build-up welding or arc welding. The invention also concerns processes for applying such a material and the uses of such a coating.

The use of nickel-based alloys with additives of chromium and molybdenum to give protection from wear and corrosion has long been known and is successfully involved in many branches of industry, for the purposes of thermal spraying and welding.

Thus for example U.S Pat. No. 4 325 995 describes a relatively large number of nickel-based alloys with additives such as chromium, molybdenum, boron, silicon and other components. U.S Pat. No. 3 999 952 also discloses alloys in the alloying range of between 5 and 15% by weight of B; between 5 and 50% by weight of Cr; between 1 and 50% by weight of Mo; and between 20 and 96% by weight of Fe, which moreover may additionally contain between 1 and 50% of Ni.

If consideration is given to those two specifications—or DE-A-25 56 960 and DE-A-38 23 140—then it is noted that they primarily discuss coating or producing sintered bodies. In regard to those previously known alloys attention is directed to their good resistance to corrosion.

With knowledge of that state of the art the inventor set himself the aim of more substantially improving alloy compositions of that kind and in particular enhancing their resistance to wear and corrosion beyond the previously known level.

That object is attained by the teachings of the present invention which set forth advantageous configurations.

By virtue of the invention it was in fact possible to manufacture alloys and with same to produce coatings whose resistance to wear and corrosion goes far beyond those properties of known alloys. That is afforded in fact by the addition of copper in a given alloying range to the additive elements molybdenum, chromium, carbon, boron and silicon, more specifically in the following ranges (in each case in percent by weight):

|   |    |           |
|---|----|-----------|
|   | C  | 0.005–1.0 ; |
|   | Cr | 10.0–26.0; |
|   | Mo | 8.0–20.0; |
|   | Fe | 0.1–10.0; |
|   | Si | 3.0–7.0; |
|   | B  | 1.0–4.0; |
|   | Cu | 0.1–5.0; |
|   | Ni | Balance, |
| in particular: | | |
|   | C  | 0.01–0.5; |
|   | Cr | 14.0–20.0; |
|   | Mo | 10.0–18.0; |
|   | Fe | 0.5–5.0; |
|   | Si | 4.0–6.5; |
|   | B  | 1.5–3.5; |
|   | Cu | 1.0–4.0; |
|   | Ni | Balance, |
| or: | | |
|   | C  | 0.05–0.3; |
|   | Cr | 15.0–18.0; |
|   | Mo | 12.0–16.0; |
|   | Fe | 2.0–4.0; |

-continued

| | |
|---|---|
| Si | 4.5–5.5; |
| B  | 2.0–3.0; |
| Cu | 2.0–3.0; |
| Ni | Balance. |

The coating material is preferably used in powder form and can then also be mixed with an Ni—B—Si-powder and/or an Ni—Cr—B—Si-powder.

The invention also embraces a process for applying a material according to the invention for the production of coatings with a high level of resistance to corrosion and wear on a workpiece by a thermal coating process, in which the coating material in powder form is alloyed and sprayed from the melt or however agglomerated from various alloyed and non-alloyed metal powders.

In addition it has been found desirable for the coating material to be used in the form of filling wire or alloyed and cast bar material.

The operation of applying the material according to the invention can be implemented by thermal spraying by means of a plasma powder build-up welding process, a flame spraying process with subsequent fusing-in, a flame spraying process—in particular a high-speed flame spraying process—, an arc two-wire spraying process or with an arc welding process.

Tests have shown that a coating produced in the described manner preferably permits the following situations of use:

as a high-temperature protective layer;
as an anti-corrosion layer;
as an anti-wear layer.

Those protective layers serve to give protection from wear and corrosion in the chemical industry or in the pharmaceutical industry, in the paper industry, in the glass industry or in the plastics-processing industry.

Further advantages, features and details of the invention will be apparent from the following description of preferred examples.

EXAMPLE 1

A shaft-protector sleeve or bush, which was very severely corroded at the surface, for an agitator in the paper industry, was to be coated by flame spraying and subsequent fusing-in, with a self-flowing alloy in powder form affording a high level of resistance to wear and corrosion. The composition of the alloy adopted was as follows (in percent by weight):

| | |
|---|---|
| C  | 0.1; |
| Cr | 16.5; |
| Mo | 13.2; |
| Fe | 4.5; |
| B  | 3.5; |
| Si | 5.0; |
| Cu | 1.5; |
| Ni | Balance. |

After cleaning and turning-down of the corroded surface, it was prepared by blasting with corundum of a grain distribution of between 0.3 and 0.6 mm, and then a layer was sprayed on to it, of a layer thickness of 1.4 mm, using an autogenous flame spray torch. After the spraying operation the layer was fused-in with an autogenous fusing-in torch and slowly cooled down - in order to avoid cracks.

After the operation of cooling it down to room temperature, the coated shaft protector sleeve or bush was machined to a surface roughness of 3 μm Ra by turning and grinding. It was not possible to detect any flaws visually at the surface of the layer.

After the maximum running time which is known for the non-coated shaft protector sleeve or bush, the sleeve or bush coated as described hereinbefore was dismantled. When the coating was checked, it was not possible to detect any corrosion attack after that running time.

EXAMPLE 2

The pump shaft of a pump in a chemical installation which, due to the medium involved therein—and the precipitated salt crystals contained therein—was subjected to a very severe corrosion and wear loading, had to be replaced after about two weeks, because of that effect on the pump shaft.

The attempt was now made to prolong that very short operating life by means of a coating. As the component is relatively sensitive to heat, a layer had to be applied without a fusing-in operation, for which reason high-velocity flame spraying (HVOF) was used as the coating process.

The spraying material in powder form that was adopted for that coating was of the following chemical composition (in percent by weight):

| | |
|---|---|
| C | 0.4; |
| Cr | 18.2; |
| Mo | 16.1; |
| Fe | 4.1; |
| B | 2.1; |
| Si | 5.5; |
| Cu | 3.0; |
| Ni | Balance. |

After preparation of the surface to be coated, by blasting with silicon carbide, it was coated with an HVOF-gun using the adopted spraying material in powder form, the thickness of the layer being 0.3 mm; the temperature of the component was 80° C. during the coating procedure.

The finished processed layer on the pump shaft was 0.2 mm thick, with very good surface quality.

As was found in an operational test, the service life of the pump shaft was increased by a factor of three by the applied coating.

EXAMPLE 3

A slide valve seat in the sugar industry, which was very severely loaded by wear, had to be replaced after a relatively short operating life because of damage to the sealing surface.

To reduce the maintenance costs, it was suggested that a coating affording better resistance to wear and corrosion should be produced by a plasma powder build-up welding process (PTA) with transferred arc and the following coating material in powder form (in percent by weight):

| | |
|---|---|
| C | 0.25; |
| Cr | 20.5; |
| Mo | 18.5; |
| Fe | 1.0; |
| B | 1.5; |

| | |
|---|---|
| Si | 4.0; |
| Cu | 2.0; |
| Ni | Balance. |

The PTA-coating operation was implemented with a current strength of 130–150 A with a powder through-put rate of 1.5 kg/h. The plasma gas used was argon/hydrogen and the protective gas was argon.

The layer applied by build-up welding was 4.0 mm in thickness and the finished processed layer was 3.0 mm thick, with a clean, pore-free and flaw-free sealing surface.

A considerable increase in service life was found in subsequent use.

EXAMPLE 4

In a sugar factory the inside of a flange was found to suffer from heavy attack at one side, by wear and corrosion. As the component is comparatively large the coating operation had to be carried out in the installed condition.

To produce the coating, a protective gas welding process (MIG) was adopted, using a filling wire with a diameter of 1.6 mm, of the following composition (in percent by weight):

| | |
|---|---|
| C | 0.25; |
| Cr | 18.0; |
| Mo | 13.0; |
| Fe | 4.2; |
| B | 1.5; |
| Si | 3.0; |
| Cu | 2.5; |
| Ni | Balance. |

After the MIG-welding procedure the coated area was dressed and the installation was put back into operation again. Even after prolonged operating times no problems occurred due to wear at the treated location.

EXAMPLE 5

An intermediate storage container of a diameter of 2.50 m and a depth of 3.0 m for cellulose solutions in a paper factory was to be protected from corrosion. In view of the dimensions of the intermediate storage container the two-wire electric arc spray process was suggested because of its relatively high spray material through-put, in order to reduce the stoppage time for the coating operation.

The spray additive material used was filling wires of a diameter of 1.6 mm. The composition of the sprayed-on layer (in percent by weight) was as follows:

| | |
|---|---|
| C | 0.5; |
| Cr | 17.0; |
| Mo | 15.2; |
| Fe | 3.0; |
| B | 2.5; |
| Si | 4.5; |
| Cu | 3.0. |

Preparation of the surface to be coated was effected by blasting with corundum of a grain size of between 0.6 and 0.8 mm. Immediately after the preparatory operation the surface was semi-automatically sprayed using a movement arrangement for the spray gun. The spraying parameters were as follows:

| Current strength | 200 A; |
|---|---|
| Voltage | 32 V; |
| Pressure of the atomisation air | 4.5 bars; |
| Spraying material through-put | 8 kg/h; |
| Spraying distance | between 200 and 250 mm. |

The layer thickness was 1.2 mm after the spraying procedure. In order to reduce the degree of roughness of the layer produced, the surface was lightly ground after the coating operation. The finished layer has no visible flaws or cracks.

The result of the treatment was highly satisfactory but until now it is not possible to report on longer-term results in use.

We claim:

1. A material which comprises: a coating material in powder or wire form on a nickel basis for producing a coating layer with a high degree of resistance to corrosion and wear by means of a thermal coating process, said coating material having a composition in percent by weight consisting of:

| C | 0.01–0.5; |
|---|---|
| Cr | 14.0–20.5; |
| Mo | 12.0–18.5; |
| Fe | 0.5–5.0; |
| Si | 3.0–6.5; |
| B | 1.5–3.5; |
| Cu | 1.5–4.0; |
| Ni | Balance. |

2. A material as set forth in claim 1, wherein the material in powder or wire form is of a composition consisting of:

| C | 0.05–0.3; |
|---|---|
| Cr | 15.0–18.0; |
| Mo | 12.0–16.0; |
| Fe | 2.0–4.0; |
| Si | 4.5–5.5; |
| B | 2.0–3.0; |
| Cu | 2.0–3.0; |
| Ni | Balance. |

3. A material as set forth in claim 1, wherein the material is in powder form and is mixed with at least one of a Ni—B—Si-powder and a Ni—Cr—B—Si-powder.

4. A material as set forth in claim 1, wherein said material is coated by flame spraying and subsequent fusing-in, wherein said material is a self-flowing alloy in powder form and has a composition consisting of:

| C | about 0.1; |
|---|---|
| Cr | about 16.5; |
| Mo | about 13.2; |
| Fe | about 4.5; |
| Si | about 5.0; |
| B | about 3.5; |
| Cu | about 1.5; |
| Ni | Balance. |

5. A material as set forth in claim 1, wherein said material is in powder form, wherein said material is applied as a coating by high-velocity flame spraying and has a composition consisting of:

| C | about 0.4; |
|---|---|
| Cr | about 18.2; |
| Mo | about 16.1; |
| Fe | about 4.1; |
| Si | about 5.5; |
| B | about 2.1; |
| Cu | about 3.0; |
| Ni | Balance. |

6. A material as set forth in claim 1, wherein said material is in powder form, wherein said material is applied by a plasma powder build-up welding process with transferred arc and has a composition consisting of:

| C | about 0.25; |
|---|---|
| Cr | about 20.5; |
| Mo | about 18.5; |
| Fe | about 1.0; |
| Si | about 4.0; |
| B | about 1.5; |
| Cu | about 2.0; |
| Ni | Balance. |

7. A material as set forth in claim 1, wherein said material is in the form of a filling wire, wherein said material is applied by means of protective gas welding processes and has a composition consisting of:

| C | about 0.25; |
|---|---|
| Cr | about 18.0; |
| Mo | about 13.0; |
| Fe | about 4.2; |
| Si | about 3.0; |
| B | about 1.5; |
| Cu | about 2.5; |
| Ni | Balance. |

8. A material as set forth in claim 1, wherein said material is in the form of a filling wire, wherein said material is applied in a two-wire arc spraying process and forms a sprayed-on layer having a composition consisting of:

| C | 0.5; |
|---|---|
| Cr | 17.0; |
| Mo | 15.2; |
| Fe | 3.0; |
| Si | 4.5 |
| B | 2.5; |
| Cu | 3.0. |

9. A material as set forth in claim 1, wherein the molybdenum content is no greater than about 15.2 percent.

10. A material according to claim 1, including a coating thickness less than about 4 mm.

11. A material according to claim 1, wherein said material is in powder form.

12. A material according to claim 1, wherein said material is in the form of a filling wire.

13. A material according to claim 1, wherein said material is a self-flowing alloy in powder form.

14. A material according to claim 1, wherein the molybdenum content is about 13.2 percent.

15. A material according to claim 1, wherein the molybdenum content is about 16.1 percent.

16. A material according to claim 1, wherein the molybdenum content is about 18.5 percent.

17. A material according to claim 1, wherein the molybdenum content is about 13.0 percent.

* * * * *